(12) United States Patent
Yang et al.

(10) Patent No.: US 11,670,473 B2
(45) Date of Patent: Jun. 6, 2023

(54) POWER DISTRIBUTION SYSTEM AND CIRCUIT BREAKER POSITION ACQUISITION METHOD

(71) Applicant: Huawei Digital Power Technologies Co., Ltd., Shenzhen (CN)

(72) Inventors: Yanxing Yang, Dongguan (CN); Wei Guo, Dongguan (CN); Xiaolong Lu, Shenzhen (CN); Zheng Li, Dongguan (CN); Zhigang Sheng, Dongguan (CN); Yongfa Li, Dongguan (CN); Hongbing Wang, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/578,833

(22) Filed: Jan. 19, 2022

(65) Prior Publication Data
US 2022/0230828 A1 Jul. 21, 2022

(30) Foreign Application Priority Data
Jan. 21, 2021 (CN) .......................... 202110082540.9

(51) Int. Cl.
*H01H 71/02* (2006.01)
*H01H 71/08* (2006.01)
*H01H 71/10* (2006.01)

(52) U.S. Cl.
CPC ...... *H01H 71/0271* (2013.01); *H01H 71/082* (2013.01); *H01H 71/1009* (2013.01);
(Continued)

(58) Field of Classification Search
CPC ............ H01H 71/0271; H01H 71/082; H01H 71/1009; H01H 2071/0278;
(Continued)

(56) References Cited

U.S. PATENT DOCUMENTS

| 2018/0003746 A1 | 1/2018 | Patel et al. |
| 2022/0277914 A1* | 9/2022 | Yang .................... G01R 31/327 |
| 2022/0285885 A1* | 9/2022 | Yin ........................ H01H 71/08 |

FOREIGN PATENT DOCUMENTS

| CN | 1779475 A | 5/2006 |
| CN | 202995107 U | 6/2013 |

(Continued)

*Primary Examiner* — Lheiren Mae A Caroc
(74) *Attorney, Agent, or Firm* — Womble Bond Dickinson (US) LLP

(57) ABSTRACT

The power distribution system includes a plug-in frame, a board located in the plug-in frame, and at least one circuit breaker. The board includes a plurality of slot positions, a position signal acquisition apparatus is disposed on the board, and the position signal acquisition apparatus is configured to acquire an address of any slot position on the board. A first end of each circuit breaker extends into the plug-in frame and is plugged to a slot position on the board, and a second end of the circuit breaker is located at an open end of the plug-in frame. The open end of the plug-in frame is provided with an address code, the address code corresponds to an address of a slot position on the board, and each circuit breaker corresponds to at least one address code.

15 Claims, 9 Drawing Sheets

(52) U.S. Cl.
CPC ............... *H01H 2071/0278* (2013.01); *H01H 2071/0292* (2013.01)

(58) Field of Classification Search
CPC ........... H01H 2071/0292; H01H 73/08; H01H 71/06; H01H 73/16; H01H 71/02; H01H 71/08; H01H 71/10; Y02B 90/20; Y04S 40/12; H02H 7/26; H02J 13/00001; H02J 13/00002; H02J 13/00006
See application file for complete search history.

(56) References Cited

FOREIGN PATENT DOCUMENTS

| | | | |
|---|---|---|---|
| CN | 103442095 | A | 12/2013 |
| CN | 105790842 | A | 7/2016 |
| CN | 110571103 | A | 12/2019 |
| CN | 111029223 | A | 4/2020 |
| CN | 210351233 | U | 4/2020 |
| CN | 111710566 | A | 9/2020 |
| CN | 112151321 | A | 12/2020 |
| WO | 2009030533 | A1 | 3/2009 |

* cited by examiner

POWER DISTRIBUTION SYSTEM AND CIRCUIT BREAKER POSITION ACQUISITION METHOD

CROSS-REFERENCE TO RELATED APPLICATION

This application claims priority to Chinese Patent Application No. 202110082540.9, filed on Jan. 21, 2021, which is hereby incorporated by reference in its entirety.

TECHNICAL FIELD

The present invention relates to the field of power distribution system technologies, in particular to a power distribution system and a circuit breaker position acquisition method.

BACKGROUND

Power distribution is an extremely important link during generation, transmission, and use of electricity. A power distribution system includes a transformer and various high-voltage and low-voltage electrical devices. A circuit breaker is a widely used electrical device. The circuit breaker can implement operations such as cutting off a fault circuit in a grid based on amplitudes of a current signal, a voltage signal, and the like in a grid system, to ensure a normal operation of each line in the grid and meet normal electricity usage of a user.

When the circuit breaker is in use, the circuit breaker is usually assembled in a plug-in frame for power distribution. Specifically, a board is disposed in an accommodation slot of the plug-in frame, the board is fixed in the accommodation slot, the board is provided with a corresponding contact, one end face of the circuit breaker is also provided with a contact, the circuit breaker is accommodated in the accommodation slot of the plug-in frame, and the contact on the circuit breaker is in contact with a corresponding contact on a circuit board in a housing, to implement current transmission between the circuit breaker and the board. During application, a plurality of circuit breakers are arranged side by side in each plug-in frame.

However, after the plurality of circuit breakers are fixedly mounted in the plug-in frame, when one or more of the circuit breakers is faulty, a specific position of a fault circuit breaker cannot be confirmed, thereby causing difficulty in maintenance.

SUMMARY

Embodiments of this application provide a power distribution system and a circuit breaker position acquisition method, to resolve at least a problem that a specific position of a fault circuit breaker cannot be confirmed in the conventional technology.

An embodiment of this application provides a power distribution system, including a plug-in frame, a board located in the plug-in frame, and at least one circuit breaker.

The board includes a plurality of slot positions, a position signal acquisition apparatus is disposed on the board, and the position signal acquisition apparatus is configured to acquire an address of any slot position on the board.

A first end of each of the circuit breakers extends into the plug-in frame and is plugged to a slot position on the board, and a second end of the circuit breaker is located at an open end of the plug-in frame.

The open end of the plug-in frame is provided with address codes, the address codes correspond to addresses of the slot positions on the board, and each of the circuit breakers corresponds to at least one of the address codes.

In the power distribution system provided in this embodiment of this application, the position signal acquisition apparatus is disposed on the board, so that the address of any slot position on the board can be monitored in real time; and then the address codes are matched with the addresses of the slot positions on the board, to position the circuit breakers. In this way, when a circuit breaker at a specific position in the plug-in frame is abnormally loosened or is faulty, the circuit breaker that is abnormally loosened or is faulty can be positioned in time, so that the position of the circuit breaker that is abnormally loosened or is faulty can be quickly found, and the circuit breaker can be replaced in time. Therefore, a maintenance time can be shortened, and a maintenance workload of a worker can be reduced, to save human and material resources.

In some embodiments of the first aspect,
the power distribution system further includes a positioning structure.

The positioning structure is disposed at the open end of the plug-in frame, the address codes are disposed on the positioning structure, and a side, provided with the address codes, of the positioning structure is close to the second end of the circuit breaker.

There are a plurality of the circuit breakers, and the plurality of circuit breakers are arranged side by side.

The positioning structure is located between top end faces of the plurality of circuit breakers and an inner wall of the plug-in frame. In the power distribution system provided in this embodiment of this application, the positioning structure is disposed on the top end faces of the plurality of circuit breakers, so that the address codes can be conveniently matched with the plurality of circuit breakers, to further help the worker quickly find the circuit breaker that is faulty or abnormally loosened.

In some embodiments of the first aspect, one end of the plug-in frame is provided with an inward-recessed accommodation slot, and one end, provided with the slot positions, of the board is located at the bottom of the accommodation slot.

The first end of each of the circuit breakers extends into the accommodation slot and is plugged to the board.

A first end of the positioning structure is located in the accommodation slot, and a second end of the positioning structure is located at a notch of the accommodation slot or located on a top end face of the second end of the circuit breaker.

In the power distribution system provided in this embodiment of this application, the first end of the positioning structure is disposed in the accommodation slot, and the second end is located at the notch of the accommodation slot or located on the top end face of the second end of the circuit breaker. In this way, the positioning structure can be fixed at an open end of the accommodation slot, so that the address codes on the positioning structure can be conveniently viewed, and the circuit breaker that is faulty or abnormally loosened can be quickly found.

In a some embodiments of the first aspect, the second end of the positioning structure is provided with a side face extending in an arrangement direction of the circuit breakers, and the address codes are located on the side face.

In the power distribution system provided in this embodiment of this application, the side face extending in the arrangement direction of the circuit breakers is disposed, so that the address codes can be conveniently attached to the side face. Therefore, an arrangement space is provided for the address codes, to ensure that the address codes can be clearly displayed on the side face, to facilitate viewing.

In some embodiments of the first aspect, one of the circuit breakers is plugged to at least one of the slot positions, and each of the circuit breakers is electrically connected to one of the slot positions.

The position signal acquisition apparatus is configured to acquire an address of the slot position electrically connected to the circuit breaker.

In some embodiments of the first aspect, an indicator is disposed on the circuit breaker, and the indicator is used to point to the address code corresponding to the circuit breaker.

In some embodiments of the first aspect, the power distribution system further includes a control unit, where the position signal acquisition apparatus is connected to the control unit, and the control unit is configured to monitor in real time address information acquired by the position signal acquisition apparatus.

The control unit is disposed in the power distribution system provided in this embodiment of this application, so that the address information acquired by the position signal acquisition apparatus can be monitored in real time. Therefore, whether the power distribution system is faulty can be discovered in time. It should be noted that when address information monitored by the control unit is not consistent with previously detected address information, it indicates that a circuit breaker is abnormally loosened or is faulty. In other words, when the address information monitored by the control unit lacks address information of a specific slot position, it indicates that a circuit breaker is abnormally loosened or is faulty.

In some embodiments of the first aspect, the control unit includes a display panel, and the display panel is configured to display the address information acquired by the position signal acquisition apparatus.

In the power distribution system provided in this embodiment of this application, the display panel is disposed on the control unit, so that the address information of the slot positions on the board can be more intuitively viewed, address information of a slot connected to the circuit breaker that is faulty or abnormally loosened can be conveniently viewed, and the address information of the slot can be conveniently matched with an address code on the positioning structure, to determine a position of the circuit breaker connected to the circuit breaker, and accordingly, save a maintenance time.

In some embodiments of the first aspect, the positioning structure has an elongated strip-shaped structure, and the positioning structure includes a display board.

The address codes are arranged side by side on the display board in the arrangement direction of the circuit breakers.

In some embodiments of the first aspect, protrusion structures are disposed on top end faces of the circuit breakers.

The positioning structure is provided with grooves matching the protrusion structures, and the positioning structure is disposed on the top end faces of the circuit breakers through matching between the grooves and the protrusion structures.

In some embodiments of the first aspect, one side, facing away from the circuit breakers, of the positioning structure is connected to the plug-in frame through an adhesive layer.

In some embodiments, a magnetic material is disposed on a side, facing away from the circuit breakers, of the positioning structure, and the positioning structure is connected to the plug-in frame through attraction between the magnetic material and the plug-in frame.

In some embodiments, the positioning structure is connected to the plug-in frame through a fastener.

In the power distribution system provided in this embodiment of this application, the adhesive layer is disposed on the positioning structure, so that stability of a connection between the positioning structure and the plug-in frame can be increased. In addition, a structure is simple and costs are low in this type of connection mode.

In the power distribution system provided in this embodiment of this application, the connection between the positioning structure and the plug-in frame is implemented by disposing the magnetic material, so that the structure is simple. In addition, the magnetic material can be reused for energy saving and environment protection.

In the power distribution system provided in this embodiment of this application, a fixed connection between the plug-in frame and the positioning structure is implemented through the fastener, so that mounting is convenient and the costs are low.

In some embodiments of the first aspect, at least some of the plurality of circuit breakers each correspond to three of the address codes.

In some embodiments, at least some of the plurality of circuit breakers each correspond to two of the address codes.

In some embodiments, some of the plurality of circuit breakers each correspond to three of the address codes, and some of the circuit breakers each correspond to two of the address codes.

In some embodiments of the first aspect, one end, connected to the board, of each circuit breaker is provided with a slot, and a jack electrically connected to any one of the slot positions on the board is disposed in some of the slots.

An embodiment further provides a circuit breaker position acquisition method, used to acquire a position of a circuit breaker in the power distribution system described above. The method includes:

obtaining an address of a slot position through which a board is electrically connected to a circuit breaker in the power distribution system;

determining whether the slot position electrically connected to the circuit breaker is abnormal;

if the slot position electrically connected to the circuit breaker is abnormal, obtaining a corresponding address code on the plug-in frame in the power distribution system based on the address corresponding to the slot position; and determining the circuit breaker corresponding to the abnormal slot position based on the corresponding address code on the plug-in frame.

In the circuit breaker position acquisition method provided in this embodiment of this application, a position of a circuit breaker can be quickly found by using the power distribution system, and then when a circuit breaker is faulty or abnormally loosened, the circuit breaker can be quickly found. In addition, in this method, intelligent positioning of a circuit breaker can be implemented, to remotely control opening and closing of any circuit breaker, and further remotely control a load output at the circuit breaker. These and other aspects, implementations, and advantages of the example embodiments will become evident with reference to the accompanying drawings and based on the embodiments described below. However, it should be understood that the specification and the accompanying drawings are only intended for illustrative purposes and do not serve as definitions that limit this application. Details are described in the appended claims. Other aspects and advantages of this application will be described in the following descriptions. Some aspects and advantages will become evident in the descriptions or learned of through practice of this application. In addition, the aspects and advantages of this application can be achieved and obtained by using the means particularly specified in the appended claims or a combination thereof.

DESCRIPTION OF REFERENCE SIGNS

Figure 1:
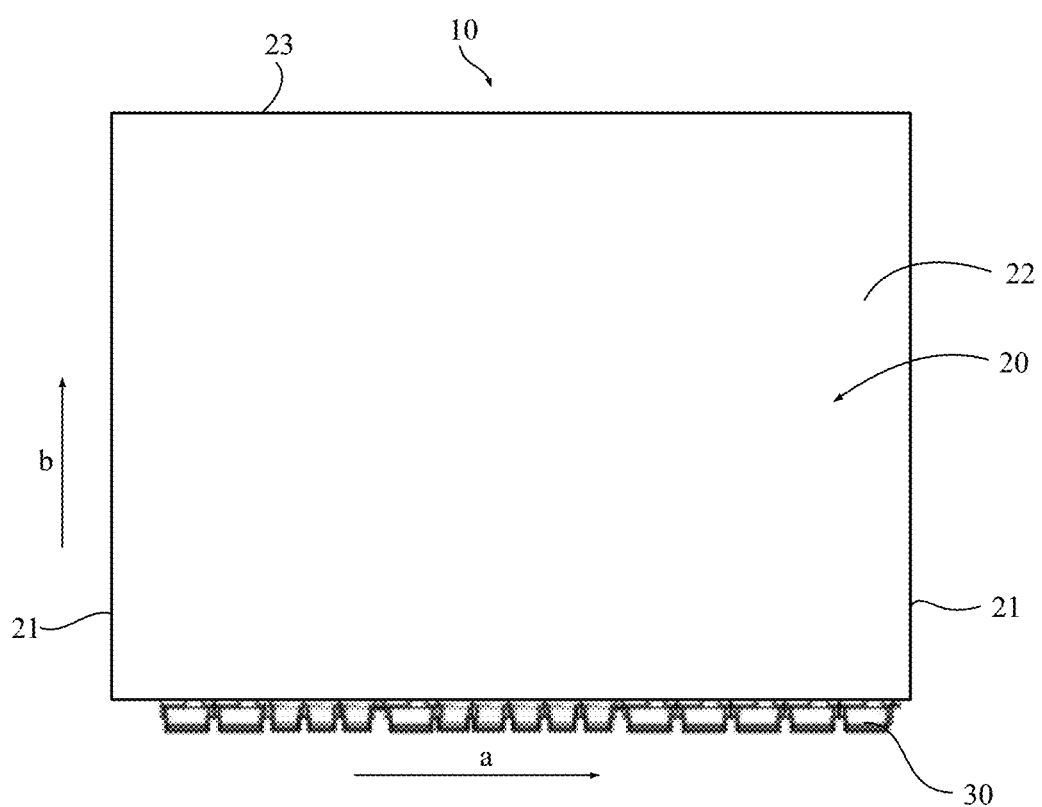
FIG. 1 is a top view of a power distribution system according to an embodiment of this application.

10—power distribution system; 20—plug-in frame; 21—retaining wall; 22—top wall; 23—rear slot wall; 24—bottom wall; 30—circuit breaker; 31—first end of the circuit breaker; 32—second end of the circuit breaker; 33—top end face; 34—protrusion structure; 35—slot; 351—jack; 36—first circuit breaker; 37—second circuit breaker; 38—indicator; 40—board; 41—slot position; 42—position signal acquisition apparatus; 50—positioning structure; 51—first end of the positioning structure; 52—second end of the positioning structure; 53—side face; 54—display board; 55—address code; 56—adhesive layer; 57—groove; 60—control unit.

DESCRIPTION OF EMBODIMENTS

Terms used in implementations of this application are merely used to explain specific embodiments of this application, but are not intended to limit this application.

With an increasing demand for electricity, services that can meet people's normal life orders and social development needs more efficiently and quickly are implemented, and an implementation of a smart grid strategy is promoted, to achieve comprehensive monitoring and application. Power distribution is an extremely important link during generation, transmission, and use of electricity. A power distribution system includes a transformer and various high-voltage and low-voltage electrical devices. A low-voltage circuit breaker is a widely used electrical device. The circuit breaker can implement operations such as cutting off a fault circuit in a grid based on amplitudes of a current signal, a voltage signal, and the like in a grid system, to ensure a normal operation of each line in the grid and meet normal electricity usage of a user.

With the development of the communication energy industry, how to improve maintenance efficiency of a circuit breaker in a plug-in frame becomes a technical problem in the communication industry. Usually, the circuit breaker is fixed at a mounting position of the plug-in frame. During actual application, a front side wall of the plug-in frame is recessed inwardly to form an accommodation slot. The accommodation slot includes two retaining walls that are disposed opposite to each other, and a top wall, a bottom wall, and a rear slot wall that are located between the two retaining walls. Two ends of the top wall are respectively fixed at top ends of the two retaining walls, two ends of the rear slot wall are respectively connected to side edges of the two retaining walls, and the bottom wall and the top wall are oppositely disposed, that is, two ends of the bottom wall are respectively fixed at bottom ends of the two retaining walls. The two retaining walls, the top wall, the bottom wall, and the rear slot wall together enclose accommodation space of the plug-in frame.

For convenience of description, a direction of the accommodation slot from one of the retaining walls to the other may be used as a width direction of the accommodation slot. A notch of the accommodation slot is disposed opposite to the rear slot wall.

When the circuit breaker is in use, the circuit breaker is usually assembled in the accommodation slot of the plug-in frame. Specifically, a board is disposed in the accommodation slot of the plug-in frame, the board is fixed in the accommodation slot, the board is provided with a corresponding contact, one end face of the circuit breaker is also provided with a contact, the circuit breaker is accommodated in the accommodation slot of the plug-in frame, and the contact on the circuit breaker is in contact with a corresponding contact on a circuit board in a housing, to implement current transmission between the circuit breaker and the board. During application, a plurality of circuit breakers are arranged side by side in each plug-in frame.

However, after the plurality of circuit breakers are fixedly mounted in the plug-in frame, when one or more of the circuit breakers is faulty, a specific position of a fault circuit breaker cannot be confirmed. In the conventional technology, the circuit breakers are usually removed from the board one by one for testing, but this causes a difficulty in maintenance and a low effect.

To resolve the foregoing problems, the embodiments of this application provide a power distribution system and a circuit breaker position acquisition method. A position signal acquisition apparatus is disposed on a board, the position signal acquisition apparatus monitors an address of any slot position on the board, and then address codes on a positioning structure are matched with addresses of slot positions on the board. Therefore, circuit breakers can be quickly positioned. In this way, when a circuit breaker at a specific position in the plug-in frame is abnormally loosened or is faulty, the circuit breaker that is abnormally loosened or is faulty can be positioned in time based on a correspondence between the addresses of the slot positions and the address codes on the positioning structure, so that the position of the circuit breaker that is abnormally loosened or is faulty can be quickly found, and the circuit breaker can be replaced in time. Therefore, a maintenance time can be shortened, and a maintenance workload of a worker can be reduced, to save human and material resources.

The power distribution system and the circuit breaker position acquisition method are described in detail through the following embodiments.

Embodiment 1

Figure 2:
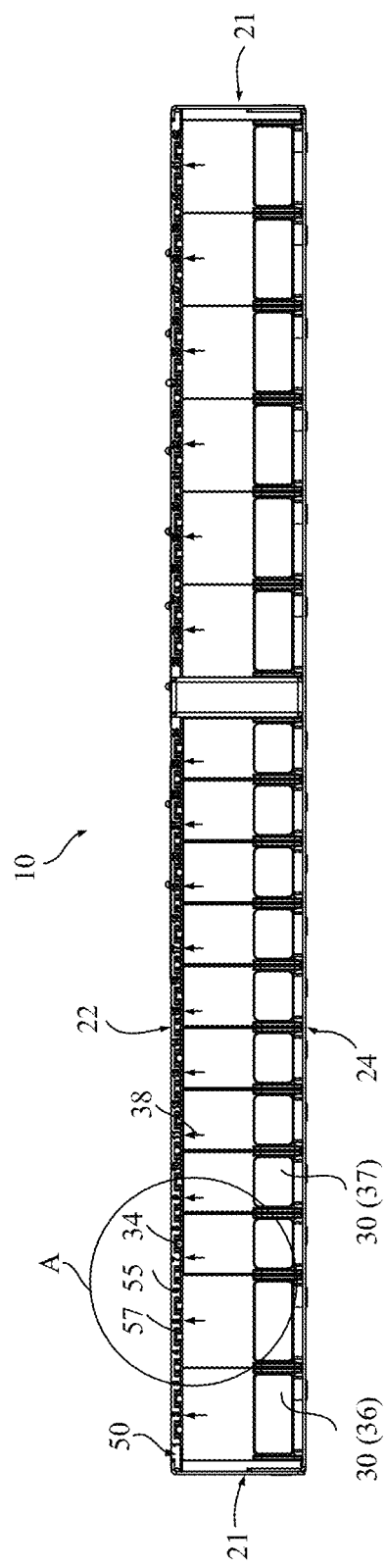
FIG. 2 is a main view of a power distribution system according to an embodiment of this application.
Figure 3:
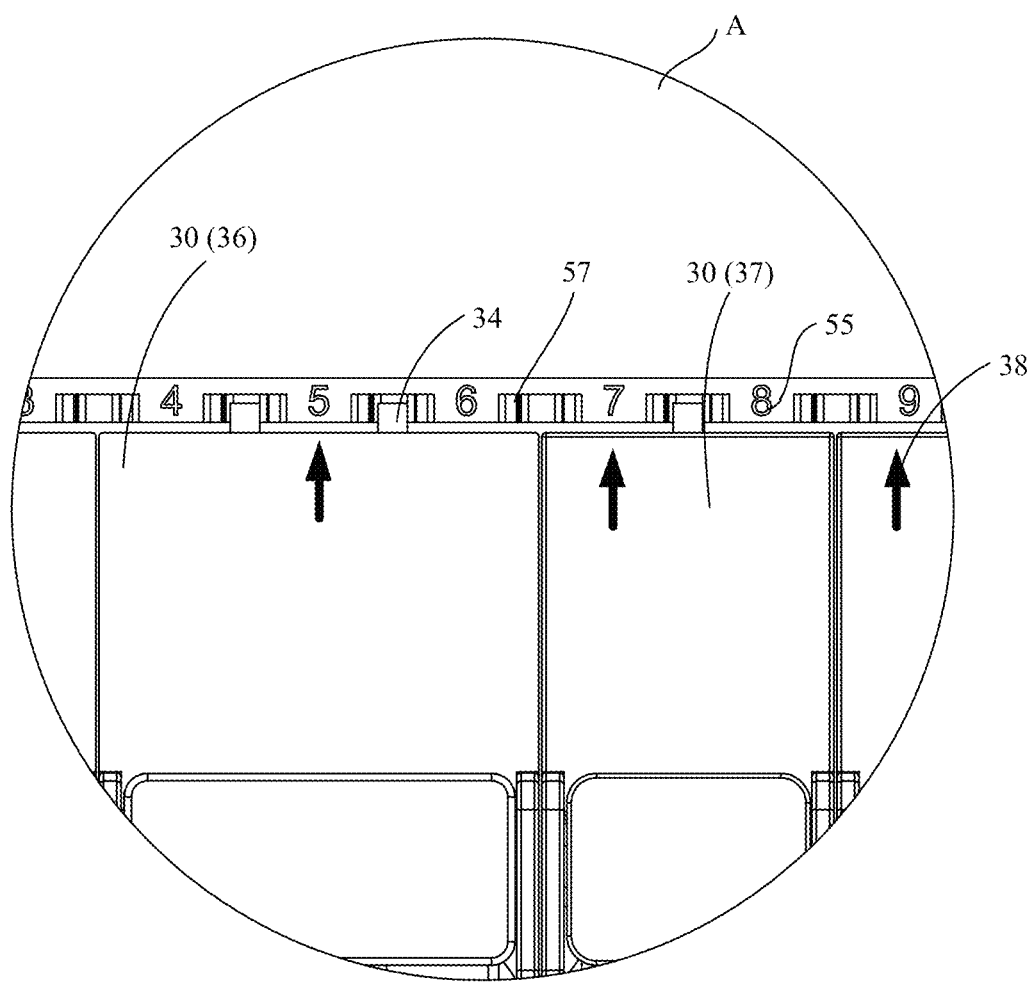
FIG. 3 is an enlarged view of a section A in FIG. 2.
Figure 4:
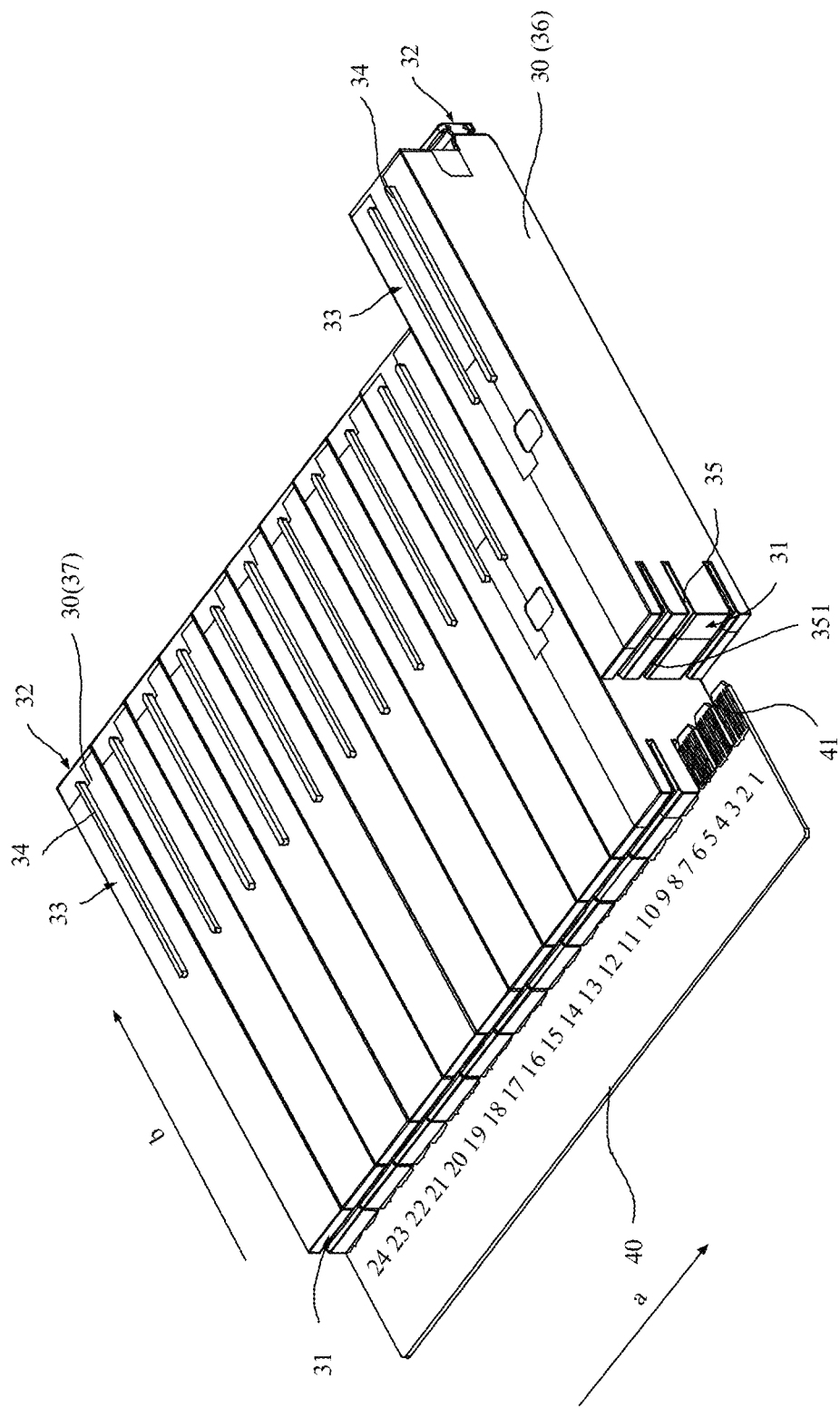
FIG. 4 is a schematic diagram of a structure of a connection between a board and a circuit breaker according to an embodiment of this application.

FIG. 1 is a top view of a power distribution system according to an embodiment of this application; FIG. 2 is a main view of a power distribution system according to an embodiment of this application; FIG. 3 is an enlarged view of a section A in FIG. 2; and FIG. 4 is a schematic diagram of a structure of a connection between a board and a circuit breaker according to an embodiment of this application. As shown in FIG. 1 to FIG. 4, this embodiment of this application provides a power distribution system 10. A circuit breaker 30 in the power distribution system 10 is a low-voltage electrical device, and can implement operations such as cutting off a fault circuit in a grid based on amplitudes of a current signal, a voltage signal, and the like in a grid system, to ensure a normal operation of each line in the grid and meet normal electricity usage of a user.

As shown in FIG. 1, the power distribution system 10 in this embodiment of this application includes a plug-in frame 20. A side, for example, the front side, of the plug-in frame 20 is recessed inwardly to form an accommodation slot, and a board 40 and a plurality of circuit breakers 30 that are arranged side by side are disposed in the accommodation slot. The accommodation slot includes two retaining walls 21 that are disposed opposite to each other, and a top wall 22, a bottom wall 24, and a rear slot wall 23 that are located between the two retaining walls 21. Two ends of the top wall 22 are respectively fixed at top ends of the two retaining walls 21, the bottom wall 24 is disposed opposite to the top wall 22, two ends of the bottom wall 24 are respectively fixed at bottom ends two retaining walls 21, and two ends of the rear slot wall 23 are respectively connected to side edges of the two retaining walls 21. The two retaining walls 21, the top wall 22, the bottom wall 24, and the rear slot wall 23 together enclose accommodation space of the accommodation slot.

For convenience of description, a direction of the accommodation slot from one retaining wall 21 to the other retaining wall 21 may be used as a width direction (a direction shown by an arrow a in FIG. 1) of the accommodation slot. A direction of the accommodation slot from a notch to the rear slot wall 23 is used as an extension direction (a direction shown by an arrow b in FIG. 1) of the accommodation slot.

As shown in FIG. 2 and FIG. 3, an open end of the plug-in frame 20 is provided with address codes 55, and the address codes 55 are disposed at an open end of the accommodation slot, to facilitate viewing by a worker.

Further, the power distribution system 10 may further include a positioning structure 50. The positioning structure 50 is disposed at the open end of the plug-in frame 20, namely, the open end of the accommodation slot. The address codes 55 are disposed on a side, facing an outer side of the accommodation slot, of the positioning structure 50. The positioning structure 50 is disposed between top faces of the circuit breakers 30 and the top wall 22 of the plug-in frame 20, and extends in the width direction of the accommodation slot. The plurality of circuit breakers 30 are arranged side by side in the accommodation slot of the plug-in frame 20 in the width direction of the accommodation slot. The address codes 55 on the positioning structure 50 correspond to the plurality of circuit breaker 30. Each circuit breaker 30 corresponds to two or three address codes 55.

It should be noted that a side, provided with the address codes 55, of the positioning structure 50 faces the outer side of the accommodation slot, to facilitate the worker to view the address code 55 corresponding to any circuit breaker 30.

It should be noted that in this embodiment of this application, the address codes 55 may be directly disposed at the open end of the plug-in frame 20 through silk-screen printing, or an independent positioning structure 50 may be disposed, and the circuit breakers 30 are positioned by disposing the address codes 55 on the positioning structure 50. Any technical solution in which the circuit breakers 30 are positioned by setting addresses on the board 40 to correspond to the address codes 55 on the plug-in frame 20 falls within the protection scope of this application.

As shown in FIG. 4, the board 40 is disposed in the plug-in frame 20, and the board 40 includes a plurality of slot positions 41. A first end 31 of each circuit breaker extends into the plug-in frame 20 and is plugged to a slot position 41 on the board 40, and a second end 32 of the circuit breaker is located outside the plug-in frame 20. In addition, a position signal acquisition apparatus 42 is disposed on the board 40. The position signal acquisition apparatus 42 is configured to acquire an address of any slot position 41 on the board 40, and addresses of the slot positions 41 on the board 40 correspond to the address codes 55 on the positioning structure 50.

It may be understood that the address codes 55 on the positioning structure 50 correspond to the circuit breakers 30, and the address codes 55 on the positioning structure 50 correspond to the addresses of the slot positions 41 on the board 40. Accordingly, the addresses of the slot positions 41 on the board 40 correspond to the circuit breakers 30. Therefore, positions of the circuit breakers 30 may be quickly positioned based on address information of the slot positions 41 on the board 40.

In the power distribution system 10 provided in this embodiment of this application, the position signal acquisition apparatus 42 is disposed on the board 40, so that the address of any slot position 41 on the board 40 may be monitored in real time; and the address codes 55 on the positioning structure 50 are matched with the addresses of the slot positions 41 on the board 40, to code addresses of the circuit breakers 30. In this way, when a circuit breaker 30 at a specific position in the plug-in frame 20 is abnormally loosened or is faulty, the circuit breaker 30 that is abnormally loosened or is faulty can be positioned in time, so that the position of the circuit breaker 30 that is abnormally loosened or is faulty can be quickly found, and the circuit breaker can be replaced in time. Therefore, a maintenance time can be shortened, and a maintenance workload of the worker can be reduced, to save human and material resources.

In the power distribution system 10 provided in this embodiment of this application, the positioning structure 50 is disposed on top end faces 33 of the plurality of circuit breakers 30, so that the address codes 55 can be conveniently matched with the plurality of circuit breakers 30, to further help the worker quickly find the circuit breaker 30 that is faulty or abnormally loosened.

As shown in FIG. 4, one end, provided with the slot positions 41, of the board 40 is positioned at the bottom of the accommodation slot, and contacts electrically connected to the circuit breakers 30 are disposed on the slot positions 41 on the board 40. Slots 35 electrically connected to the slot positions 41 on the board 40 are disposed at the first ends 31 of the circuit breakers, and jacks 351 electrically connected to the slot positions 41 on the board 40 are disposed in some of the slots 35. During application, the contacts on the slot positions 41 on the board 40 match with the jacks 351 of the circuit breakers 30, to implement an effective electrical connection between the board 40 and the circuit breakers 30.

It should be understood that the first end 31 of the circuit breaker is an end located inside the plug-in frame 20, and the first end is connected to the board 40; and the second end 32 of the circuit breaker is an end located at an outer side of the plug-in frame 20, and the second end is disposed at an outer side of the notch of the accommodation slot.

It should be noted that shapes and quantities of the slots 35 and the jacks 351 of the circuit breakers 30 do not constitute a limitation on the protection scope of the technical solution of this application. As long as there is a structure reliably and electrically connected to the slot positions 41 on the board 40, the structure falls within the protection range of the technical solution of this application.

As shown in FIG. 4, the circuit breakers 30 in this embodiment have cuboid structures, the jacks 351 connected to the slot positions 41 on the board 40 are disposed at the first ends 31 of the circuit breakers, and the second ends 32 of the circuit breakers are located at the outer side of the plug-in frame 20.

It should be noted that positions of the second ends 32 of the circuit breakers are determined by lengths of the circuit breakers 30. Therefore, the second ends 32 of the circuit breakers are not limited to be located at the outer side of the plug-in frame 20, and may, in some embodiments, be located at an inner side of the plug-in frame 20, or may be flush with the open end of the plug-in frame 20. In other words, the positions of the second ends 32 of the circuit breakers do not constitute a limitation on the protection scope of the technical solution of this application. As long as the circuit breakers 30 are disposed, the circuit breakers fall within the protection scope of the technical solution of this application.

Figure 5:
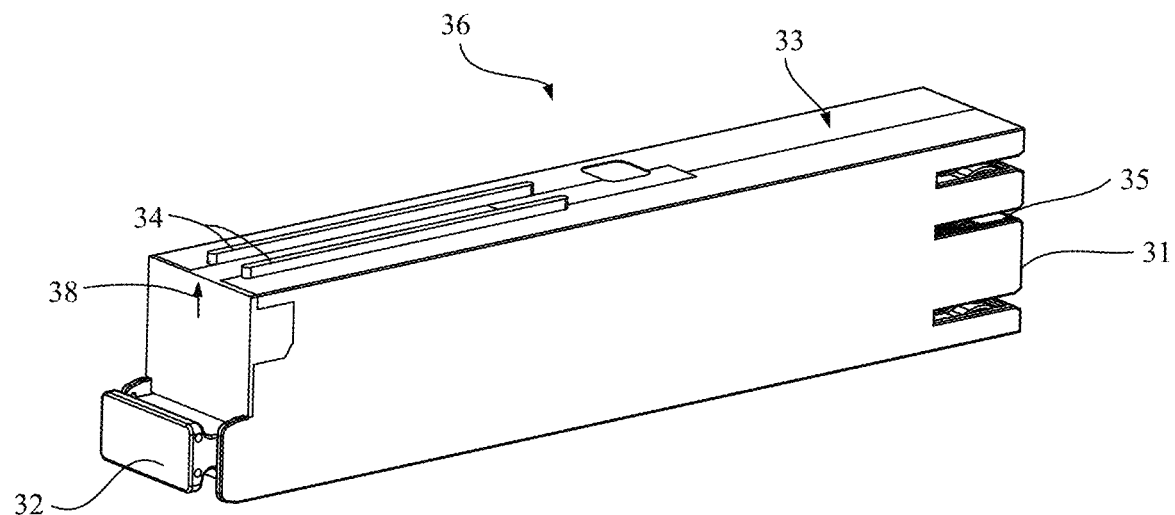
FIG. 5 is a schematic diagram of a structure of a first circuit breaker according to an embodiment of this application.
Figure 6:
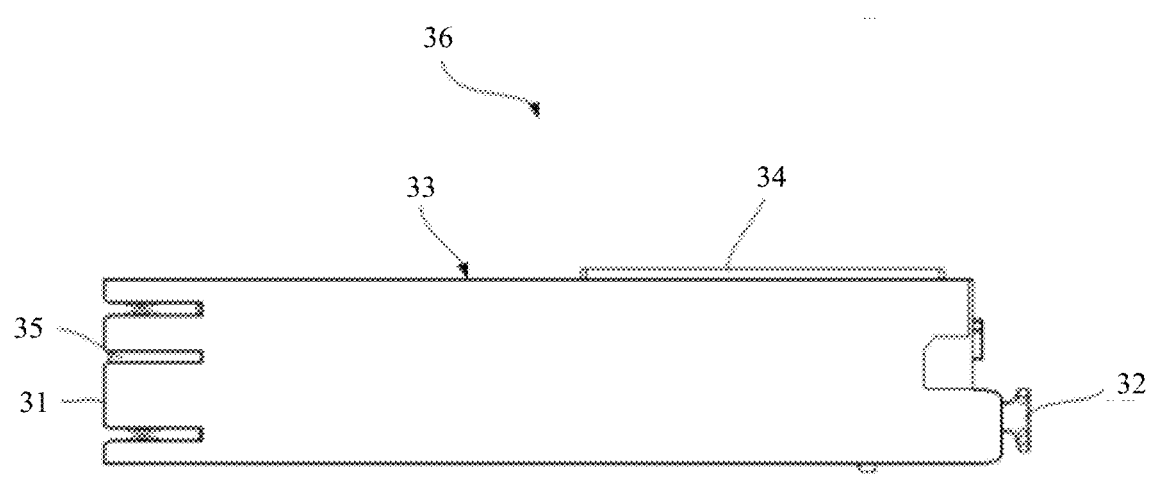
FIG. 6 is a side view of the circuit breaker in FIG. 5.

FIG. 5 is a schematic diagram of a structure of a first circuit breaker according to an embodiment of this application; FIG. 6 is a side view of the circuit breaker in FIG. 5; and FIG. 7 is a schematic diagram of a structure of a first end of the circuit breaker in FIG. 5.

Figure 7:
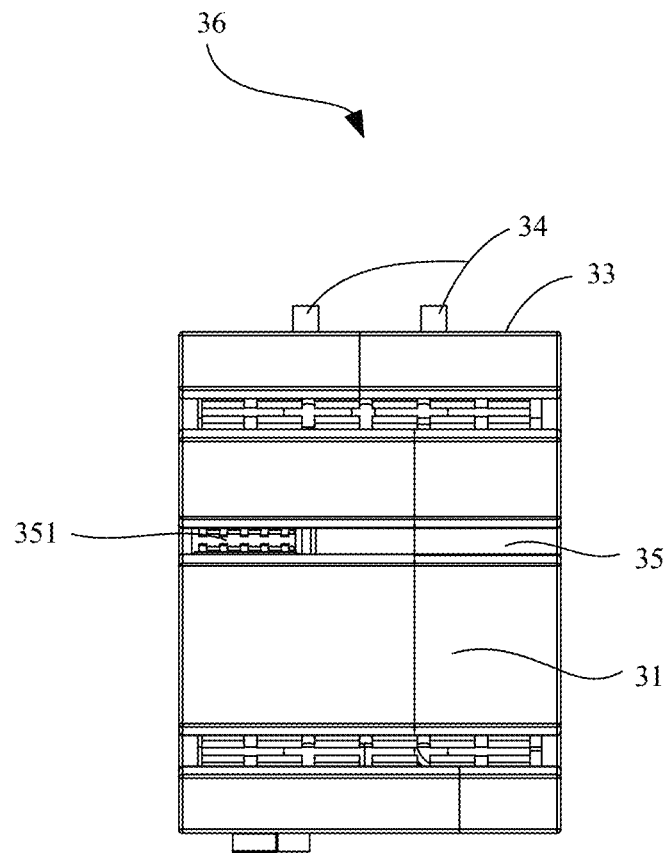
FIG. 7 is a schematic diagram of a structure of a first end of the circuit breaker in FIG. 5.

As shown in FIG. 5 to FIG. 7, the first circuit breaker 36 is shown. A slot 35 of the first circuit breaker 36 is plugged to a slot position 41 on the board 40. The slot 35 is provided with a jack 351. The slot 35 has a width capable of accommodating three slot positions 41, but the jack 351 has a width capable of accommodating only one slot position 41, and only the jack 351 can be electrically connected to the slot position 41. An end face, close to the top wall 22 of the accommodation slot, of the first circuit breaker 36 is a top end face 33, a protrusion structure 34 matching with the positioning structure 50 is disposed on the top end face 33, and two protrusion structures 34 are disposed on the first circuit breaker 36 of this model.

Figure 8:
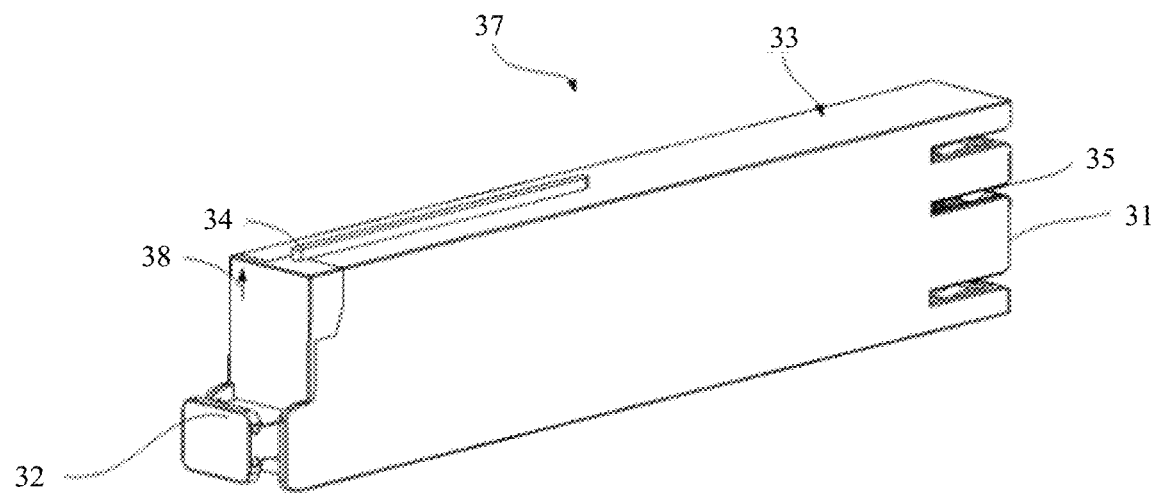
FIG. 8 is a schematic diagram of a structure of a second circuit breaker according to an embodiment of this application.
Figure 9:
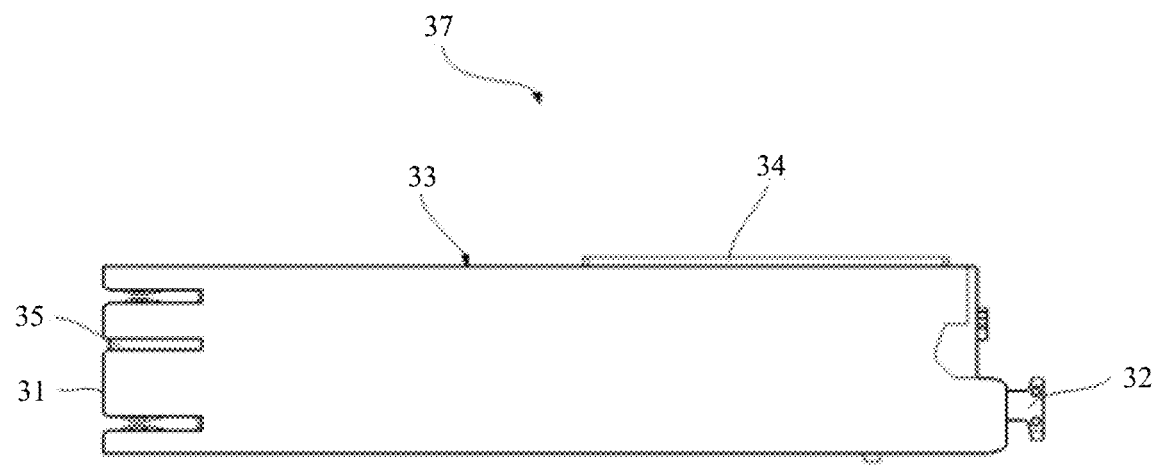
FIG. 9 is a side view of the circuit breaker in FIG. 8.

FIG. 8 is a schematic diagram of a structure of a second circuit breaker according to an embodiment of this application; FIG. 9 is a side view of the circuit breaker in FIG. 8; and FIG. 10 is a schematic diagram of a structure of a first end of the circuit breaker in FIG. 8.

Figure 10:
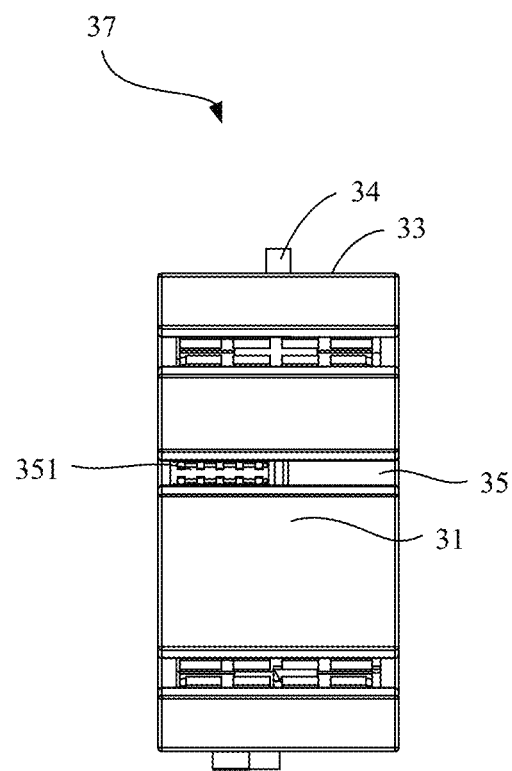
FIG. 10 is a schematic diagram of a structure of a first end of the circuit breaker in FIG. 8.

As shown in FIG. 8 to FIG. 10, the second circuit breaker 37 is shown. A slot 35 of the second circuit breaker 37 is plugged to a slot position 41 on the board 40. The slot 35 is provided with a jack 351. The slot 35 has a width capable of accommodating two slot positions 41, but the jack 351 has a width capable of accommodating only one slot position 41, and only the jack 351 can be electrically connected to the slot position 41. An end face, close to the top wall 22 of the accommodation slot, of the second circuit breaker 37 is a top end face 33, a protrusion structure 34 matching with the positioning structure 50 is disposed on the top end face 33, and one protrusion structure 34 is disposed on the second circuit breaker 37 of this model.

It should be noted that the protrusion structure 34 located on the top end face 33 of the circuit breaker 30 is configured for cooperatively mounting with the positioning structure 50. In other words, the protrusion structure 34 is disposed on the top end face 33 of the circuit breaker 30, to facilitate mounting of the positioning structure 50. Therefore, shapes and quantities of the protrusion structures 34 may be designed based on a specific shape of the positioning structure 50, and specific shapes and quantities of the protrusion structures do not constitute a limitation on the protection scope of the technical solution of this application.

Further, when a mounting part for mounting the positioning structure 50 is disposed at the notch of the accommodation slot of the plug-in frame 20, the protrusion structure 34 may not be disposed on the circuit breaker 30. Therefore, a specific structure of the circuit breaker 30 is not specifically limited, provided that a function of the circuit breaker can be implemented.

Further, an indicator 38 may be disposed on an end face of the second end 32 of the circuit breaker, and the indicator 38 may be used to indicate an address code 55 corresponding to the circuit breaker. The indicator 38 may point to an address code 55 corresponding to a slot position 41 correspondingly and electrically connected to the circuit breaker 30, or may point to a specific address code 55 corresponding to the circuit breaker 30. In addition, a connection mode between the indicator 38 and the circuit breaker 30 and a shape of the indicator 38 do not constitute a limitation on the protection scope of the technical solution of this application. For example, the indicator 38 may be disposed on the circuit breaker 30 through a printing process, may be pasted on the circuit breaker 30, or may be directly engraved on the circuit breaker 30. As long as the indicator can be fixed on the circuit breaker 30, the indicator belongs to the protection scope of the technical solution of this application. In addition, in this embodiment, the indicator 38 is shaped as an arrow (as shown in FIG. 2 and FIG. 3). Certainly, in some examples, the indicator 38 may be a pattern mark combining a character and an arrow.

Figure 11:
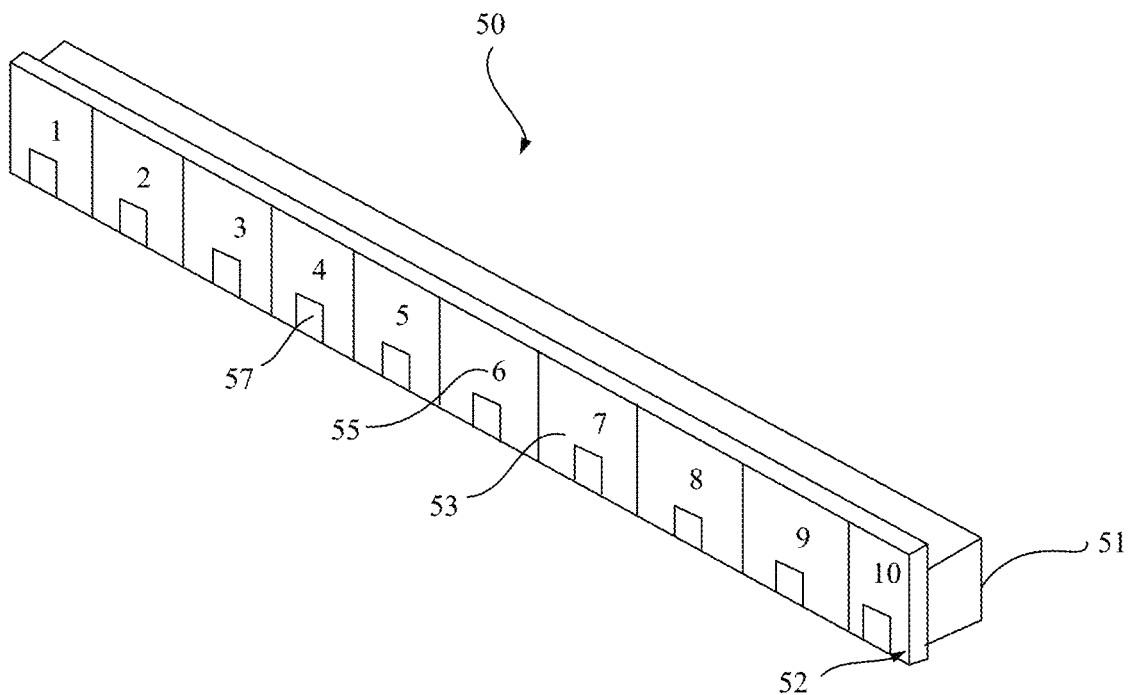
FIG. 11 is a schematic diagram of a structure of a positioning structure according to an embodiment of this application.

As shown in FIG. 11, the positioning structure 50 has an elongated strip-shaped structure, and a first end 51 of the positioning structure is located in the accommodation slot. A second end 52 of the positioning structure is located at the notch of the accommodation slot or located on the top end face 33 of the second end 32 of the circuit breaker. The positioning structure 50 is provided with a groove 57 matching with the protrusion structure 34 of the circuit breaker 30. The positioning structure 50 is disposed on the top end face 33 of the circuit breaker 30 through matching between the groove 57 and the protrusion structure 34. The second end 52 of the positioning structure is provided with a side face 53 extending in an arrangement direction of the circuit breakers 30. The address codes 55 are located on the side face 53.

It should be noted that a structure matching with the protrusion structure 34 of the circuit breaker 30 is not limited to the groove 57, and may, in some embodiments, be a through hole disposed in the positioning structure 50. In addition, a projection of the through hole on the rear slot wall 23 of the accommodation slot covers a projection of the protrusion structure 34 on the rear slog wall 23 of the accommodation slot. In this way, when the circuit breaker 30 needs to be replaced, the circuit breaker 30 can be pulled out smoothly without disassembling the positioning structure 50, so that a flow of replacing the circuit breaker 30 is simplified, a maintenance time is saved, and a useful life of the positioning structure 50 is prolonged.

In the power distribution system 10 provided in this embodiment of this application, the first end 51 of the positioning structure is disposed in the accommodation slot, and the second end 52 of the positioning structure is located at the notch of the accommodation slot or located on the top end face 33 of the second end 32 of the circuit breaker. In this way, the positioning structure 50 can be fixed at the open end of the accommodation slot, so that the address codes 55 on the positioning structure 50 can be conveniently viewed, and the circuit breaker 30 that is faulty or abnormally loosened can be quickly found.

In the power distribution system 10 provided in this embodiment of this application, the side face 53 extending in the arrangement direction of the circuit breakers 30 is disposed on the positioning structure 50, so that the address codes 55 can be conveniently attached to the side face 53. Therefore, an arrangement space is provided for the address codes 55, to ensure that the address codes 55 can be clearly displayed on the side face 53, to facilitate viewing.

In the power distribution system 10 of this embodiment of this application, one circuit breaker 30 is plugged to at least one slot position 41, and each circuit breaker 30 is electrically connected to one of the slot positions 41. The position signal acquisition apparatus 42 is configured to acquire an address of the slot position 41 electrically connected to the circuit breaker 30.

The power distribution system 10 in this embodiment of this application further includes a control unit 60. The position signal acquisition apparatus 42 is connected to the control unit 60, and the control unit 60 is configured to monitor in real time address information acquired by the position signal acquisition apparatus 42.

The control unit 60 is disposed in the power distribution system 10 provided in this embodiment of this application, so that the address information acquired by the position signal acquisition apparatus 42 can be monitored in real time. Therefore, whether the power distribution system 10 is faulty can be discovered in time. It should be noted that when address information monitored by the control unit 60 is not consistent with previously detected address information, it indicates that a circuit breaker 30 is abnormally loosened or is faulty. In other words, when the address information monitored by the control unit 60 lacks address information of a specific slot position 41, it indicates that a circuit breaker 30 is abnormally loosened or is faulty.

Further, the control unit 60 includes a display panel (not shown). The display panel is configured to display the address information acquired by the position signal acquisition apparatus 42.

In the power distribution system 10 provided in this embodiment of this application, the display panel is disposed on the control unit 60, so that the address information of the slot positions 41 on the board 40 can be more intuitively viewed, address information of a slot 35 connected to the circuit breaker 30 that is faulty or abnormally loosened can be conveniently viewed, and the address information of the slot 35 can be conveniently matched with an address code 55 on the positioning structure 50, to determine a position of the circuit breaker 30 connected to the slot 35, and accordingly, save a maintenance time.

When the circuit breaker 30 is plugged to the plug-in frame 20, the circuit breaker 30 is electrically connected to a specific slot position 41 on the board 40, and the position signal acquisition apparatus 42 acquires address information of the slot position 41 electrically connected to the circuit breaker 30. The address codes 55 on the positioning structure 50 correspond to the address information of the slot positions 41 on the board 40, the address codes 55 on the positioning structure 50 correspond to the circuit breakers 30 in the width direction of the accommodation slot, a circuit breaker 30 corresponding to three slot positions 41 corresponds to the three address codes 55, and a circuit breaker 30 corresponding to two slot positions 41 corresponds to two address codes 55. In the foregoing three address codes 55 corresponding to the circuit breaker 30, an address code 55 corresponding to a slot position 41 for eclectically connecting the circuit breaker 30 and the board 40 is a valid address code. In the foregoing two address codes 55 corresponding to the circuit breaker 30, an address code 55 corresponding to a slot position 41 for eclectically connecting the circuit breaker 30 and the board 40 is a valid address code. An arrow on the circuit breaker 30 points to the foregoing valid address code, so that the address code 55 corresponding to the circuit breaker 30 can be more intuitively and conveniently viewed.

For convenience of understanding, that the circuit breaker 30 (namely, the first circuit breaker 36) corresponding to three address codes 55 and the circuit breaker 30 (namely, the second circuit breaker 37) corresponding to two address codes 55 are disposed in the plug-in frame 20 is used as an example for description. Specifically, as shown in FIG. 4, there are 11 circuit breakers 30, two of the circuit breakers 30 (for example, the two circuit breakers on the right in FIG. 4) each correspond to three address codes 55 (for example, the address codes 4, 5, and 6 in FIG. 3) and three slot positions 41, and each circuit breaker 30 in the other nine circuit breakers 30 corresponds to two address codes 55 (for example, the address codes 7 and 8 in FIG. 3) and two slot positions 41. The board 40 is provided with 24 slot positions 41, and addresses corresponding to the 24 slot positions 41 are sequentially from right to left: address 1, address 2, address 3, address 4, address 5, address 6, address 7, address 8, address 9, address 10, address 11, address 12, address 13, address 14, address 15, address 16, address 17, address 18, address 19, address 20, address 21, address 22, address 23, and address 24.

After the circuit breakers 30 are plugged to the slot positions 41 on the board 40, there are 11 slot positions 41 for electrically connecting circuit breakers 30 to the board 40, and the addresses corresponding to the 11 slot positions are: the address 2, the address 5, the address 7, the address 9, the address 11, the address 13, the address 15, the address 17, the address 19, the address 21, and the address 23. In other words, the slot positions 41 corresponding to the address 2, the address 5, the address 7, the address 9, the address 11, the address 13, the address 15, the address 17, the address 19, the address 21, and the address 23 on the board 40 are respectively electrically connected to the 11 circuit breakers 30, to implement signal transmission, and the slot positions 41 corresponding to the other addresses are not electrically connected to but are mechanically plugged to and matched with the circuit breakers 30. In this way, the position signal acquisition apparatus 42 on the board 40 automatically collects and feeds back a signal of one circuit breaker 30 at each of the slot positions 41 corresponding to the address 2, the address 5, the address 7, the address 9, the address 11, the address 13, the address 15, the address 17, the address 19, the address 21, and the address 23 to a central controller.

When a specific circuit breaker 30 is loosened or has a fault, for example, the second circuit breaker 30 on the right in FIG. 4 is loosened or has a fault, the slot position 41 corresponding to the address 5 cannot provide a signal, so that it can be determined that the slot position 41 corresponding to the address 5 is abnormal. However, since the slot positions 41 on the board 40 are usually located in the plug-in frame 20, maintenance personnel cannot view the slot position 41 corresponding to the address 5 and the circuit breaker 30 electrically connected to the slot position 41 corresponding to the address 5. However, in this embodiment of this application, based on a correspondence between the address 5 and an address code 55 on the positioning structure 50, it can be determined that the address code 55, corresponding to the address 5, on the positioning structure 50 is 5, and then a position where the address code 55 is 5 is found in the positioning structure 50. In this case, a corresponding circuit breaker 30 can be found based on the position of the corresponding address code 55 on the positioning structure 50 (refer to the circuit breaker 30 corresponding to the address code 55 that is 5 in FIG. 3). In this way, the circuit breaker 30 that is loosened or faulty can be quickly found.

It should be noted that the addresses 1 to 24 on the board 40 in FIG. 4 are merely used as an example for description, and the addresses corresponding to the slot positions 41 are not disposed on the board 40 during actual application.

In this embodiment of this application, the address codes 55 on the positioning structure 50 correspond to the addresses of the slot positions 41 on the board 40, and a width of one slot position 41 is the same as that of one address code 55, so that circuit breakers 30 and the addresses of the slot positions 41 electrically connected to the circuit breakers 30 can be determined based on positions of the address codes 55 on the positioning structure 50.

It should be noted that an electrical connection between each circuit breaker 30 and a slot position 41 on the board 40 may be specifically set based on a specific situation. A correspondence between each circuit breaker 30 and an address code 55 on the positioning structure 50 does not constitute a limitation on the protection scope of the technical solution of this application. As long as the positioning structure 50 is disposed, and the address codes 55 on the positioning structure 50 correspond to the addresses of the slot positions 41 on the board 40, the positioning structure falls within the protection scope of the technical solution of this application.

During actual application, the address code 55 corresponding to the circuit breaker 30 that is faulty or abnormally loosened can be determined by comparing differences between two pieces of address information collected by the control unit 60 at two different time points. For example, if addresses at which the control unit 60 acquires signals for the first time are the address 2, the address 4, the address 6, the address 8, the address 10, and the address 12, and addresses at which the control unit acquires signals for the second time is the address 4, the address 6, the address 8, and the address 12, it indicates that there is no signal at the slot positions 41 corresponding to the address 2 and the address 10. In this way, it can be determined that the circuit breakers 30 corresponding to the address codes 55 that are 2 and 10 are faulty or abnormally loosened based on the addresses. Since the address codes 55 on the positioning structure 50 correspond to the circuit breakers 30 and the addresses of the slot positions 41 on the board 40, positions of the circuit breakers 30 corresponding to the address 2 and the address 10 can be quickly found, and then the circuit breakers 30 that are loosened or faulty can be repaired or replaced.

It should be noted that a form of the address codes 55 may be Arabic numerals or letters, that is, the form of the address codes 55 does not constitute a limitation on the protection scope of the technical solution of this application, and can be used for distinguishing between the circuit breakers 30, so that the address codes fall within the protection scope of the technical solution of this application.

In this embodiment of this application, as shown in FIG. 11, the positioning structure 50 may have an elongated strip-shaped structure, and the positioning structure 50 may include a display board 54; and the address codes 55 are arranged side by side on the display board 54 in the arrangement direction of the circuit breakers 30, and one side, provided with the address codes 55 (namely the side face 53 extending in the arrangement direction of the circuit breaker 30), of the display board 54 faces the outer side of the accommodation slot, to facilitate viewing.

Specifically, the display board 54 may be a plate-like structure adhered to the positioning structure 50, and the address codes 55 are disposed on the plate-like structure.

It should be noted that a shape of the display board 54 does not constitute a limitation on the protection scope of the technical solution of this application. As long as the display board 54 is disposed, the display board 54 is fixedly connected to the positioning structure 50, and the address codes 55 are disposed on the display board 54, the display board falls within the protection scope of the technical solution of this application.

By setting the display board 54 as a plate-like structure adhered to the positioning structure 50, the display board is convenient to replace, and costs are low. Specifically, when the address codes 55 on the display board 54 are not clearly displayed, a layer of display board 54 that can clearly display the address codes may be additionally adhered to the display board 54 directly.

In a further embodiment of this application, at least some circuit breakers 30 in the plurality of circuit breakers 30 each correspond to three address codes 55, and the circuit breaker 30 corresponding to three address codes 55 may be a 125 A circuit breaker; and at least some circuit breakers 30 in the plurality of circuit breakers 30 each correspond to two address codes 55, and the circuit breaker 30 corresponding to two address codes 55 may be a 63 A circuit breaker.

In a further embodiment of this application, some of the circuit breakers 30 in the plurality of circuit breakers 30 each correspond to three address codes 55, and some of the circuit breakers 30 each correspond to two address codes 55, where the circuit breaker 30 corresponding to three address codes 55 may be a 125 A circuit breaker, and the circuit breaker 30 corresponding to two address codes 55 may be a 63 A circuit breaker.

It should be noted that a model of the circuit breaker 30 and a quantity of address codes 55 corresponding to the circuit breaker 30 of a specific model are not limited to the foregoing embodiments. For example, one circuit breaker 30 may correspond to four address codes 55, five address codes 55, or six address codes 55. This is not enumerated herein. In addition, a quantity of the circuit breakers 30 of a specific model does not constitute a limitation on the protection scope of the technical solution of this application. As long as a plurality of circuit breakers 30 are disposed on the power distribution system, the circuit breakers fall within the technical solution of this application.

This embodiment further provides a circuit breaker 30 position acquisition method, used to acquire a position of a circuit breaker 30 in the power distribution system 10 described above. The method includes:

obtaining an address of a slot position 41 through which the board 40 is electrically connected to the circuit breaker 30 in the power distribution system 10;

determining whether the slot position 41 electrically connected to the circuit breaker 30 is abnormal;

if the slot position 41 electrically connected to the circuit breaker 30 is abnormal, obtaining a corresponding address code 55 on the plug-in frame 20 or the positioning structure 50 in the power distribution system 10 based on the address corresponding to the slot position 41; and determining the circuit breaker 30 corresponding to the abnormal slot position 41 based on the corresponding address code 55 on the plug-in frame 20 or the positioning structure 50.

Figure 13:
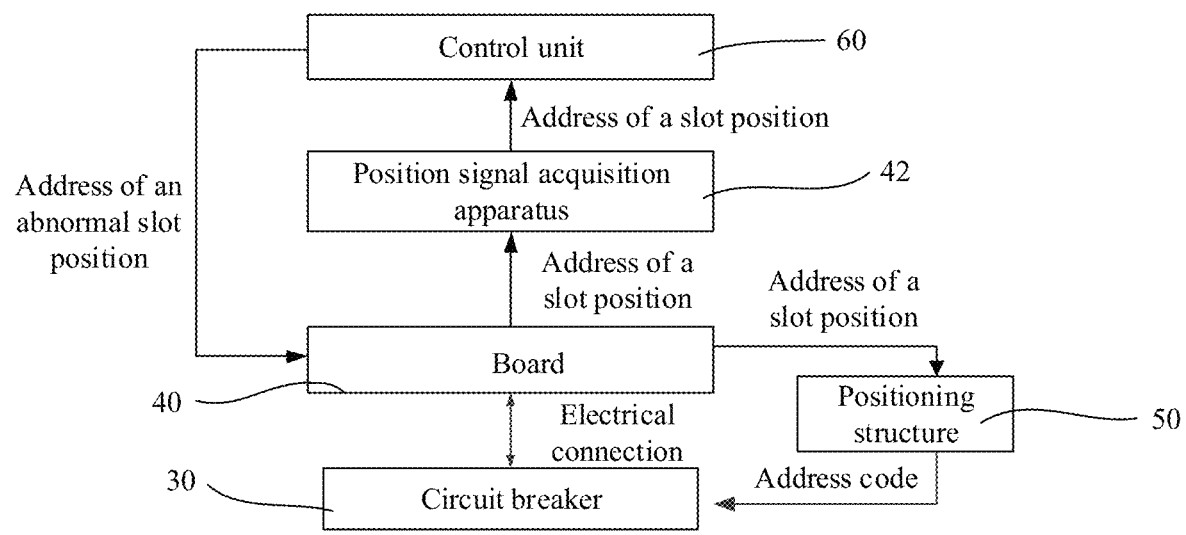
FIG. 13 is a flowchart of a circuit breaker position acquisition method according to an embodiment of this application.

As shown in FIG. 13, a specific flow of positioning a circuit breaker by using the power distribution system includes:

First, the board 40 is electrically connected to the circuit breakers 30; then the position signal acquisition apparatus 42 acquires the addresses of the slot positions 41 corresponding to the circuit breakers 30 electrically connected to the board 40; then the position signal acquisition apparatus 42 sends the addresses to the control unit 60; and when an abnormality occurs in a circuit breaker 30, the control unit 60 cannot receive a signal of the slot position 41, that is, the control unit 60 does not receive a signal at an address corresponding to the slot position 41, then finds a corresponding address code 55 on the positioning structure 50 through the address of the slot position 41, and then finds the circuit breaker 30 corresponding to the abnormality based on the address code 55.

The following describes the circuit breaker 30 position acquisition method by using the address codes 55 that are 1, 2, 3, 4, . . . , and n:

First, the position signal acquisition apparatus 42 is disposed on the board 40 in the plug-in frame 20, and the address information of the slot positions 41 on the board 40 is Arabic numerals 1, 2, 3, 4, . . . , and n in sequence in the width direction of the accommodation slot, where one slot position 41 corresponds to one Arabic numeral; the address codes 55 on the plug-in frame 20 or the positioning structure 50 correspond to the addresses on the board 40 and are also 1, 2, 3, 4, . . . , and n in sequence in the width direction of the accommodation slot; and a plurality of circuit breakers 30 are arranged in the plug-in frame 20 in the width direction of the accommodation slot, and are plugged to any slot positions 41 on the board 40, the position signal acquisition apparatus 42 is triggered to operate after the circuit breakers 30 are plugged, and in this case, the position signal acquisition apparatus 42 sends acquired address information of the slot positions 41 electrically connected to the circuit breakers 30 to the control unit 60, and displays specific address information on the display panel.

Specifically, when all the circuit breakers 30 are plugged to the board 40, the position signal acquisition apparatus 42 automatically collects address information and reflects the acquired address information to the control unit 60. It is assumed that when all the circuit breakers 30 are in a normal operating state, the control unit 60 can detect that there is a signal of one circuit breaker 30 at each of the address 3, the address 6, the address 8, the address 10, the address 12, the address 14, the address 16, the address 18, the address 20, . . . , and the address n.

At a specific time point, the control unit 60 detects that there is a signal of one circuit breaker 30 at each of the address 3, the address 6, the address 10, the address 12, the address 14, the address 16, the address 18, the address 20, . . . , and the address n.

The control unit 60 compares information acquired twice and finds that no signal is detected at the address 8 at the last time, that is, the control unit 60 acquires that the address slot position 41 is abnormal.

Then, it is determined that the circuit breaker 30 at the address 8 is in an abnormal state; then a position where the address code 55 is 8 is found on the plug-in frame 20 or the positioning structure 50 based on a correspondence between the address 8 and the address code 55 on the positioning structure 50; and then, the abnormal circuit breaker 30 is determined based on the position of the address code 55, so that the abnormal circuit breaker 30 can be maintained.

In the circuit breaker 30 position acquisition method provided in this embodiment of this application, a position of a circuit breaker 30 can be quickly positioned by using the power distribution system 10, and then when a circuit breaker 30 is faulty or abnormally loosened, the circuit breaker 30 can be quickly found. In addition, in this method, intelligent positioning of a circuit breaker 30 can be implemented, to remotely control opening and closing of any circuit breaker 30, and further remotely control a load output at the circuit breaker.

It should be understood that when a circuit breaker 30 is plugged to any slot position 41, the position signal acquisition apparatus 42 automatically collects and reflects a signal of the circuit breaker 30 at an address corresponding to the slot position 41 to the control unit 60, and displays the address of the slot position 41 corresponding to the circuit breaker 30 at the position. When the circuit breaker 30 is abnormally loosened or is faulty, the position signal acquisition apparatus 42 does not operate. Because the control unit 60 cannot receive a signal provided by the position signal acquisition apparatus 42, it can be determined that the circuit breaker 30 connected to the slot position 41 corresponding to the address lacking signal feedback is abnormally loosened or is faulty. The position of the circuit breaker 30 with a problem can be quickly positioned based on the address information corresponding to the address code 55 on the plug-in frame 20 or the positioning structure 50.

It should be noted that the addresses of the slot positions 41 on the board 40 and the address codes 55 on the plug-in frame 20 or the positioning structure 50 may be set to have same codes, for example, may have same Arabic numerals as described above. The addresses and the address codes may, in some embodiments, be set to have different codes, for example, the addresses of slot positions 41 on the board 40 are a, b, c, d, . . . , and z, and the address codes 55 on the plug-in frame 20 or the positioning structure 50 are 1, 2, 3, 4, . . . , and n, where a corresponds to 1, b corresponds to 2, c corresponds to 3, and so on. Intelligent positioning of the circuit breaker 30 can be implemented as long as corresponding clearance can be implemented. Therefore, the addresses of the slot positions 41 on the board 40 and the address codes 55 on the positioning structure 50 do not constitute a limitation on the protection scope of the technical solution of this application. As long as the addresses of the slot positions 41 on the board 40 and the address codes 55 on the plug-in frame 20 or the positioning structure 50 correspond to each other, the addresses and the address codes fall within the protection scope of the technical solution of this application.

Embodiment 2

Figure 12:
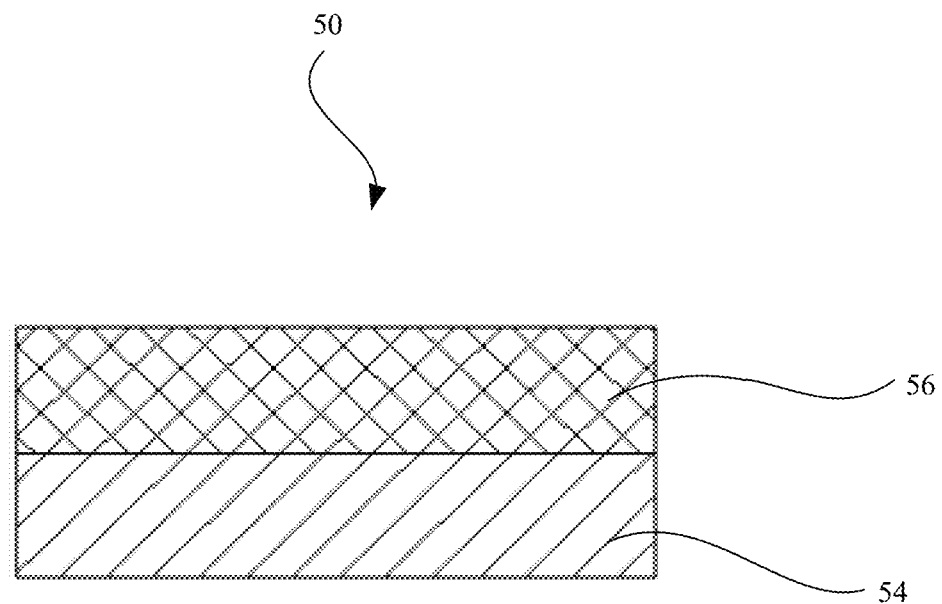
FIG. 12 is a sectional view of a positioning structure according to another embodiment of this application.

Unlike a scenario 1, as shown in FIG. 12, in this embodiment of this application, a side, facing away from a circuit breaker 30, of the positioning structure 50 is connected to a plug-in frame 20 through an adhesive layer 56.

In a power distribution system 10 provided in this embodiment of this application, the adhesive layer 56 is disposed on the positioning structure 50, so that stability of a connection between the positioning structure 50 and the plug-in frame 20 can be increased. In addition, a structure is simple and costs are low in this type of connection mode.

It should be noted that the adhesive layer 56 may be disposed on the side, facing away from the circuit breaker 30, of the positioning structure 50, or may be disposed on a side, facing an outer side of an accommodation slot, of the plug-in frame 20, to implement a reliable connection between the positioning structure 50 and the plug-in frame 20, and ensure that an address code 55 on the positioning structure 50 corresponds to the circuit breaker 30, so that the adhesive layer falls within the protection scope of the technical solution of this application.

Embodiment 3

In a further embodiment of this application, a magnetic material (not shown) is disposed on a side, facing away from a circuit breaker 30, of a positioning structure 50, and the positioning structure 50 is connected to the plug-in frame 20 through attraction between the magnetic material to the plug-in frame 20.

It should be noted that a shape, a structure, and a quantity of the magnetic material do not constitute a limitation on the protection scope of the technical solution of this application. A technical solution in which the positioning structure 50 and the plug-in frame 20 are connected by disposing the magnetic material falls within the protection scope of this application.

In a power distribution system 10 provided in this embodiment of this application, the connection between the positioning structure 50 and the plug-in frame 20 is implemented by disposing the magnetic material, so that the structure is simple. In addition, the magnetic material can be reused for energy saving and environment protection.

Embodiment 4

In a further embodiment of this application, a positioning structure 50 and a plug-in frame 20 are connected through a fastener. Specifically, the fastener may be a screw.

In a power distribution system 10 provided in this embodiment of this application, the positioning structure 50 is fixed to the plug-in frame through the fastener, so that stability of a connection between the positioning structure 50 and the plug-in frame 20 can be increased, and mounting is conveniently performed and costs are low in this type of connection mode.

It should be noted that a form of the fastener is not limited to the screw, but another fastener may be used for connection. As long as a fixed connection can be implemented, the fastener falls within the protection scope of the technical solution of this application.

In addition, it should be noted that the positioning structure 50 includes but is not limited to the forms in the foregoing embodiments. The positioning structure may, in some embodiments, be disposed as a structure electrically connected to a board 40, and an indicator light or a voice prompt module may be disposed on the positioning structure 50.

Specifically, an indicator light may be disposed for each address code 55 on the positioning structure 50, and each indicator light is electrically connected to a slot position 41 on the corresponding board 40. When a circuit breaker 30 is reliably electrically connected to the slot position 41, the indicator light at this position is in a state of emitting light, and when the circuit breaker 30 is not connected to the slot position 41, the indicator light at this position is in a state of not emitting light. In this way, whether the circuit breaker 30 is abnormal can be directly determined based on a light emission state of the indicator light.

Further, a voice prompt module may be further disposed on the positioning structure. The voice module may be configured to broadcast address information of an abnormal circuit breaker 30. The voice prompt module may be connected to a control unit 60. The voice module is triggered to broadcast the address information of the abnormal circuit breaker 30 when the address information detected by the control unit 60 is abnormal.

In the descriptions in this application, it should be noted that, unless otherwise specified or limited, terms such as "installation", "connected", and "connection" should be construed in a broad sense, for example, may be a fixed connection, may be an indirect connection by using an intermediate medium, or may be an internal connection between two elements or an interaction relationship between two elements. A person of ordinary skill in the art may understand specific meanings of the foregoing terms in this application based on specific situations.

An apparatus or element in this application or an implied apparatus or element needs to have a specific direction and be constructed and operated in a specific direction, and therefore cannot be construed as a limitation to this application. In the descriptions of this application, "a plurality of" means two or more, unless otherwise precisely and specifically specified.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments of this application described herein can be implemented in orders except the order illustrated or described herein. Moreover, the terms "include", "have" and any other variants mean to cover the non-exclusive inclusion, for example, a process, method, system, product, or device that includes a list of steps or units is not necessarily limited to those expressly listed steps and units, but may include other steps or units not expressly listed or inherent to such a process, method, system, product, or device.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A power distribution system, comprising a plug-in frame, a board located in the plug-in frame, and at least one circuit breaker, wherein:
   the board comprises a plurality of slot positions, a position signal acquisition apparatus is disposed on the board, and the position signal acquisition apparatus is configured to acquire an address of any slot position on the board;
   a first end of the at least one circuit breaker extends into the plug-in frame and is plugged to a slot position of the plurality of slot positions on the board, and a second end of the at least one circuit breaker is located at an open end of the plug-in frame;
   the open end of the plug-in frame is provided with address codes, the address codes correspond to addresses of the plurality of slot positions on the board, and the at least one circuit breaker corresponds to at least one of the address codes; and
   one end, connected to the board, of the at least one circuit breaker is provided with a slot, and a jack electrically connected to any one of the slot positions on the board is disposed in a proportion of the slots.

2. The power distribution system according to claim 1, further comprising a positioning structure, wherein the positioning structure is disposed at the open end of the plug-in frame, the address codes are disposed on the positioning structure, and a side, provided with the address codes, of the positioning structure is close to the second end of the at least one circuit breaker.

3. The power distribution system according to claim 2, wherein the at least one circuit breaker comprises a plurality of circuit breakers, and the plurality of the circuit breakers are arranged side by side, and
   wherein the positioning structure is located between top end faces of the plurality of the circuit breakers and an inner wall of the plug-in frame.

4. The power distribution system according to claim 3, wherein one end of the plug-in frame is provided with an inward-recessed accommodation slot, and one end, provided with the slot positions, of the board is located at a bottom of the accommodation slot,
   wherein the first end of each of the plurality of the circuit breakers extends into the accommodation slot and is plugged to the board, and
   wherein a first end of the positioning structure is located in the accommodation slot, and a second end of the positioning structure is located at a notch of the accommodation slot or located on the top end face of the second end of one of the plurality of the circuit breakers.

5. The power distribution system according to claim 4, wherein the second end of the positioning structure is provided with a side face extending in an arrangement direction of the circuit breakers, and the address codes are located on the side face.

6. The power distribution system according to claim 2, wherein
   the at least one circuit breaker is plugged to at least one of the slot positions, and the at least one circuit breaker is electrically connected to one of the slot positions, and
   wherein the position signal acquisition apparatus is configured to acquire an address of the slot position electrically connected to the at least one circuit breaker.

7. The power distribution system according to claim 6, wherein an indicator is disposed on the at least one circuit breaker, and the indicator is used to point to the address code corresponding to the at least one circuit breaker.

8. The power distribution system according to claim 2, wherein the positioning structure has an elongated strip-shaped structure, and the positioning structure comprises a display board, and
   wherein the address codes are arranged side by side on the display board in an arrangement direction of the at least one circuit breaker.

9. The power distribution system according to claim 8, wherein the at least one circuit breaker comprises a plurality of circuit breakers,
   wherein protrusion structures are disposed on top end faces of the plurality of circuit breakers, and
   wherein the positioning structure is provided with grooves matching the protrusion structures, and the positioning structure is disposed on the top end faces of the plurality of circuit breakers through matching between the grooves and the protrusion structures.

10. The power distribution system according to claim 8, wherein:
    a side, facing away from the at least one circuit breaker, of the positioning structure is connected to the plug-in frame through an adhesive layer; or
    a magnetic material is disposed on the side, facing away from the at least one circuit breaker, of the positioning structure, and the positioning structure is connected to the plug-in frame through attraction between the magnetic material and the plug-in frame.

11. The power distribution system according to claim 2, wherein the at least one circuit breaker comprises a plurality of circuit breakers,
    wherein protrusion structures are disposed on top end faces of the plurality of circuit breakers, and
    wherein the positioning structure is provided with grooves matching the protrusion structures, and the positioning structure is disposed on the top end faces of the plurality of circuit breakers through matching between the grooves and the protrusion structures.

12. The power distribution system according to claim 2, wherein:
    a side, facing away from the at least one circuit breaker, of the positioning structure is connected to the plug-in frame through an adhesive layer; or
    a magnetic material is disposed on the side, facing away from the at least one circuit breaker, of the positioning structure, and the positioning structure is connected to the plug-in frame through attraction between the magnetic material and the plug-in frame.

13. The power distribution system according to claim 1, further comprising a control unit, wherein the position signal acquisition apparatus is connected to the control unit, and the control unit is configured to monitor in real time address information acquired by the position signal acquisition apparatus.

14. The power distribution system according to claim 13, wherein the control unit comprises a display panel, and the display panel is configured to display the address information acquired by the position signal acquisition apparatus.

15. A circuit breaker position acquisition method to acquire a position of a circuit breaker in a power distribution system,
    wherein the power distribution system comprises a plug-in frame, a board located in the plug-in frame, and a circuit breaker, wherein the board comprises a plurality of slot positions, a position signal acquisition apparatus is disposed on the board, and the position signal acquisition apparatus is configured to acquire an address of any slot position on the board, wherein a first end of the circuit breaker extends into the plug-in frame and is plugged to a slot position of the plurality of slot positions on the board, and a second end of the circuit breaker is located at an open end of the plug-in frame, wherein the open end of the plug-in frame is provided with address codes, the address codes correspond to addresses of the plurality of slot positions on the board, and the circuit breaker corresponds to at least one of the address codes, wherein one end, connected to the board, of the circuit breaker is provided with a slot, and a jack electrically connected to any one of the slot positions on the board is disposed in a proportion of the slots, and wherein the method comprises:

obtaining an address of a slot position of the plurality of slot positions through which the board is electrically connected to the circuit breaker in the power distribution system;

determining whether the slot position electrically connected to the circuit breaker is abnormal;

if the slot position electrically connected to the circuit breaker is abnormal, obtaining a corresponding address code on the plug-in frame in the power distribution system based on the address corresponding to the slot position; and determining the circuit breaker corresponding to the abnormal slot position based on the corresponding address code on the plug-in frame.

* * * * *